United States Patent
Hanawalt et al.

(10) Patent No.: US 8,023,918 B2
(45) Date of Patent: Sep. 20, 2011

(54) METHODS AND SYSTEMS FOR STEREO NOISE MITIGATION

(75) Inventors: Steve W. Hanawalt, Austin, TX (US); Dana Taipale, Austin, TX (US)

(73) Assignee: Silicon Laboratories, Inc., Austin, TX (US)

(*) Notice: Subject to any disclaimer, the term of this patent is extended or adjusted under 35 U.S.C. 154(b) by 526 days.

(21) Appl. No.: 12/313,044

(22) Filed: Nov. 17, 2008

(65) Prior Publication Data
US 2009/0203344 A1    Aug. 13, 2009

Related U.S. Application Data

(60) Provisional application No. 61/065,605, filed on Feb. 13, 2008.

(51) Int. Cl.
*H04B 1/10*    (2006.01)
(52) U.S. Cl. ........................ 455/296; 455/298
(58) Field of Classification Search .................. None
See application file for complete search history.

(56) References Cited

U.S. PATENT DOCUMENTS

| | | | |
|---|---|---|---|
| 4,037,057 A | 7/1977 | Ogita et al. | 179/15 BT |
| 4,216,353 A | 8/1980 | Fish, Jr. | 179/1 GJ |
| 4,574,389 A | 3/1986 | Schotz | 381/10 |
| 4,607,381 A | 8/1986 | Shimizu | 381/10 |
| 4,694,500 A | 9/1987 | Tazaki et al. | 381/10 |
| 5,027,402 A | 6/1991 | Richards, Jr. et al. | 381/10 |
| 5,253,299 A | 10/1993 | Ishida et al. | 381/13 |
| 6,424,825 B1* | 7/2002 | Ecklund et al. | 455/205 |
| 6,473,605 B1* | 10/2002 | Ecklund et al. | 455/296 |
| 6,735,257 B2 | 5/2004 | Kroeger | 375/295 |
| 7,110,549 B2 | 9/2006 | Wildhagen | 381/13 |
| 7,130,433 B1 | 10/2006 | Suzuki | 381/94.8 |
| 7,272,375 B2 | 9/2007 | Tuttle et al. | 455/333 |
| 7,292,694 B2 | 11/2007 | Wildhagen | 381/13 |
| 2010/0080326 A1* | 4/2010 | Taipale et al. | 375/340 |

* cited by examiner

*Primary Examiner* — An Luu
(74) *Attorney, Agent, or Firm* — O'Keefe, Egan, Peterman & Egan, LLP

(57) ABSTRACT

Methods and systems are disclosed that mitigate stereo noise in FM broadcast receivers by assessing L–R (left-minus-right) and L+R (left-plus-right) levels within tuned FM channels. These assessments are used to facilitate control of a blend from stereo output signals to mono output signals in order to reduce and mitigate stereo noise and distortion in the audio outputs. The side effects of the disclosed systems and methods are unobtrusive as compared to prior blend-to-mono techniques.

24 Claims, 3 Drawing Sheets

METHODS AND SYSTEMS FOR STEREO NOISE MITIGATION

RELATED APPLICATIONS

This application claims priority to the following co-pending provisional application: Provisional Application Ser. No. 61/065,605, filed on Feb. 13, 2008, and entitled "STEREO NOISE MITIGATION TECHNIQUES," which is hereby incorporated by reference in its entirety.

TECHNICAL FIELD OF THE INVENTION

This invention relates to stereo receivers and, more particularly, to mitigation of noise in the playback of FM stereo broadcasts.

BACKGROUND

Broadcast channels in the FM band (e.g., about 76 MHz to 108 MHz) are often transmitted with an FM stereo multiplex (MPX) format where the MPX signal includes left (L) channel and right (R) channel information that can then be used by an FM receiver to produce stereo audio outputs. In particular, the FM stereo MPX signal format includes L+R (left-plus-right) information, L−R (left-minus-right) information and a 19 KHz pilot tone. With respect to the center frequency of the broadcast channel, the L+R information lies in a band between 30 Hz and 15 KHz from the center frequency in the broadcast channel. The L−R information lies in two bands on either side of 38 KHz from the center frequency of the broadcast channel, namely a first band between 23 KHz and 38 KHz and a second band between 38 KHz and 53 KHz. And the pilot tone sits at 19 KHz from the center frequency of the broadcast channel. Most FM receivers will produce a full stereo output by generating a left (L) channel audio output by adding the L+R and L−R signals ((L+R)+k*(L−R)=2L when k=1) and a right (R) channel audio output signal by subtracting the L+R and L−R signals ((L+R)−k*(L−R)=2R when k=1). If a mono output is desired or selected, most FM receivers will drive k to 0 in order to pass the full (L+R) signal to both the left (L) channel and the right (R) channel. In addition, varying degrees of a blend from stereo to mono can also be provided by adjusting or varying k from 1 to 0 to provide the desired level of a blend from stereo to mono.

FM broadcast band receivers can suffer from noise due to strong nearby blockers and/or other sources or conditions, and this noise or interference will often show up as static in the stereo audio output for the tuned FM channel. Techniques have been proposed before to mitigate this stereo noise. One prior technique is to use a receive signal strength indicator (RSSI) to blend the audio output from stereo to mono when the RSSI indicates poor signal strength. Another prior technique is to use a signal-to-noise ratio (SNR) measurement of the incoming signal to blend from stereo to mono when the SNR is low. The SNR measurement can be made, for example, by analyzing the amplitude modulation in the received FM broadcast signal. In addition, other solutions have proposed blending to mono based upon an analysis of variations in the FM pilot tone and/or an analysis of high frequency components that are above the frequencies for the FM information in the tuned signals. While these techniques provide some success in mitigating stereo noise, improved techniques are needed.

SUMMARY OF THE INVENTION

Methods and systems described herein provide a solution for mitigating stereo noise in broadcast channels within the FM band (e.g., about 76 MHz to 108 MHz). In particular, the methods and systems described herein provide stereo noise mitigation based upon L−R (left-minus-right) and L+R (left-plus-right) level assessments within FM channels. These assessments are used to help control a blend from stereo to mono in audio outputs in order to reduce static and distortion, for example, when a nearby blocker is encountered by the system and/or when other conditions are experienced that cause stereo noise, such as when silence or low volumes are being broadcast on an FM station. The side effects of the disclosed systems and methods are unobtrusive as compared to prior techniques and methods that are based primarily on detection of a blocker. Other features and variations could also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Methods and systems described herein provide an advantageous solution for mitigating stereo noise using an assessment of L−R (left-minus-right) and L+R (left-plus-right) levels within FM channels.

As described herein, the L−R energy of the FM multiplexed (MPX) spectrum is compared to the L+R energy. When the energy in L−R exceeds the energy in L+R, a digital signal processor (e.g., implemented in firmware) within an FM receiver can begin to blend the stereo signal into a mono signal. As the difference in energy increases, the firmware within the FM receiver can eventually force the audio output to be completely in mono. This technique advantageously reduces the noise in the reproduced stereo output signal.

An example integrated low-IF (intermediate frequency) FM receiver, for which the described embodiments may be useful, is described in U.S. Pat. No. 7,272,375, which is hereby incorporated by reference in its entirety.

It is noted that it is also possible to detect the presence of a nearby FM blocker and then blend to mono based upon an RF signal-to-noise ratio (SNR) measurement, as indicated above, but this prior SNR technique does not work nearly as well as the L−R>L+R technique because the RF SNR technique is not a good indication of the above noise condition from a nearby blocker. For example, in an integrated low-IF receiver, such as the one in the patent identified above, the RF SNR technique is typically not a reliable indicator of noise from a nearby blocker. The noise from a nearby blocker often appears only in stereo mode. If the severity of this stereo noise can be detected, a blend to mono can be based upon this detection. To detect this noise, as described with respect to the embodiments disclosed herein, the energy in the L−R signal can be compared to the energy in the L+R signal. If the L−R energy is greater than the L+R energy, then a blend from stereo to mono can be made, and the magnitude of the L−R>L+R assessment can be used to adjust the amount of this blend until full mono is reached.

Figure 1:
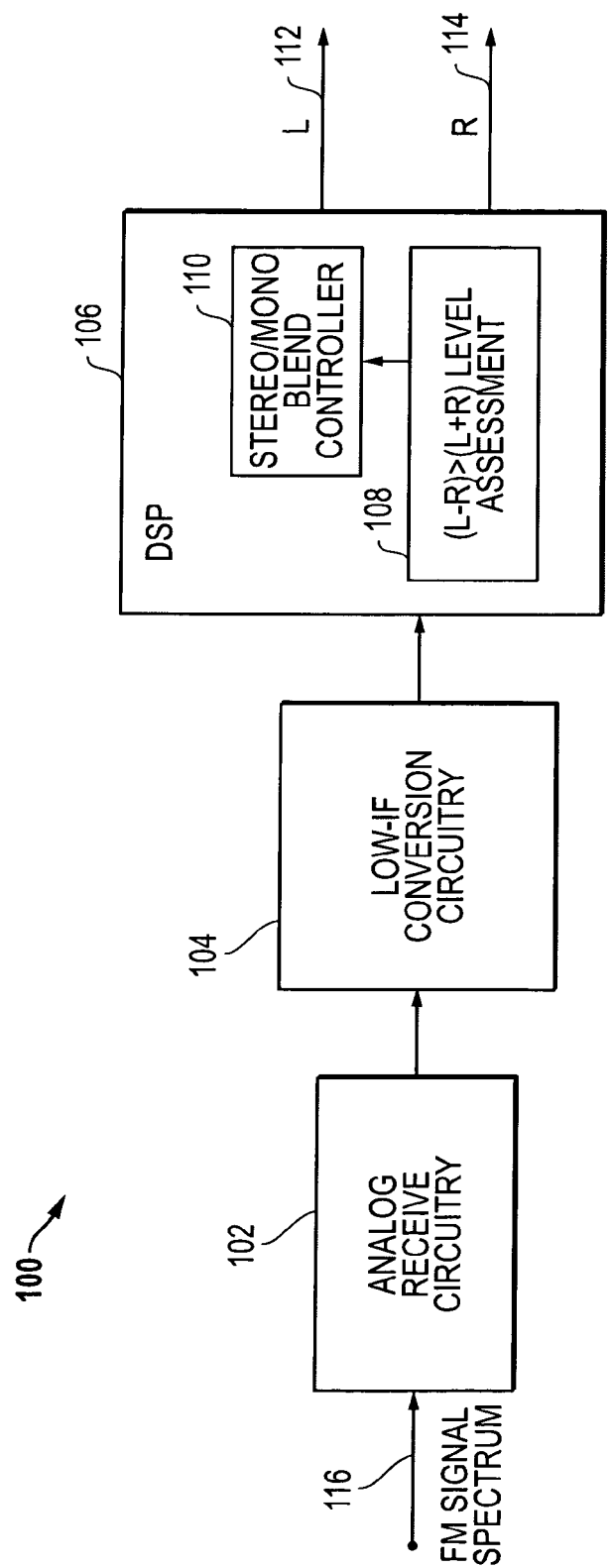
FIG. 1 is a block diagram for an embodiment including a digital signal processor (DSP) providing stereo noise mitigation based upon L−R (left-minus-right) and L+R (left-plus-right) level assessments as described herein.

FIG. 1 is a block diagram for an embodiment 100 including a digital signal processor (DSP) 106 providing stereo noise mitigation based upon L−R and L+R level assessments. In the embodiment depicted, an FM signal spectrum 116 including a plurality of FM channels is received by analog receive circuitry 102. The output of the analog receive circuitry 102 is provided to the low-IF conversion circuitry 104. The digital output of the low-IF conversion circuitry is then processed by the DSP 106 to produce digital and/or analog audio output signals. For example, the DSP 106 can produce stereo output signals in the form of a left (L) channel signal 112 and a right (R) channel signal 114.

As described herein, the DSP 106 further provides for processing of the digital signals to determine if the output should be blended to mono due to possible interference. As described above, a mono output is typically created by nulling the (L−R) contribution to the stereo signal such that (L+R) is output on both the right (R) channel signal 114 and on the left (L) channel signal 112. The stereo/mono blend controller 110 within the DSP 106 makes the determination of when to perform the blend from stereo to mono. To help make this determination of when to blend from stereo to mono, an assessment of L−R and L+R levels is used by the stereo/mono blend controller 110. In particular, as depicted, block 108 provides a level assessment of whether or not the L−R energy is greater than the L+R energy (i.e., an L−R>L+R assessment) along with an indication of the magnitude of this difference, if desired. And the stereo/mono blend controller 110 uses this L−R>L+R assessment to perform a blend from stereo to mono. It is noted, however, that to remove side-effects of this technique in artificial laboratory created situations such as where the left (L) signal energy is set to be a negative version of the right (R) signal energy (L=−R), the blend can be disabled for situations where L−R is much greater than L+R. This determination can be made, for example, using a maximum threshold level, which can be programmably selectable if desired.

Figure 2:
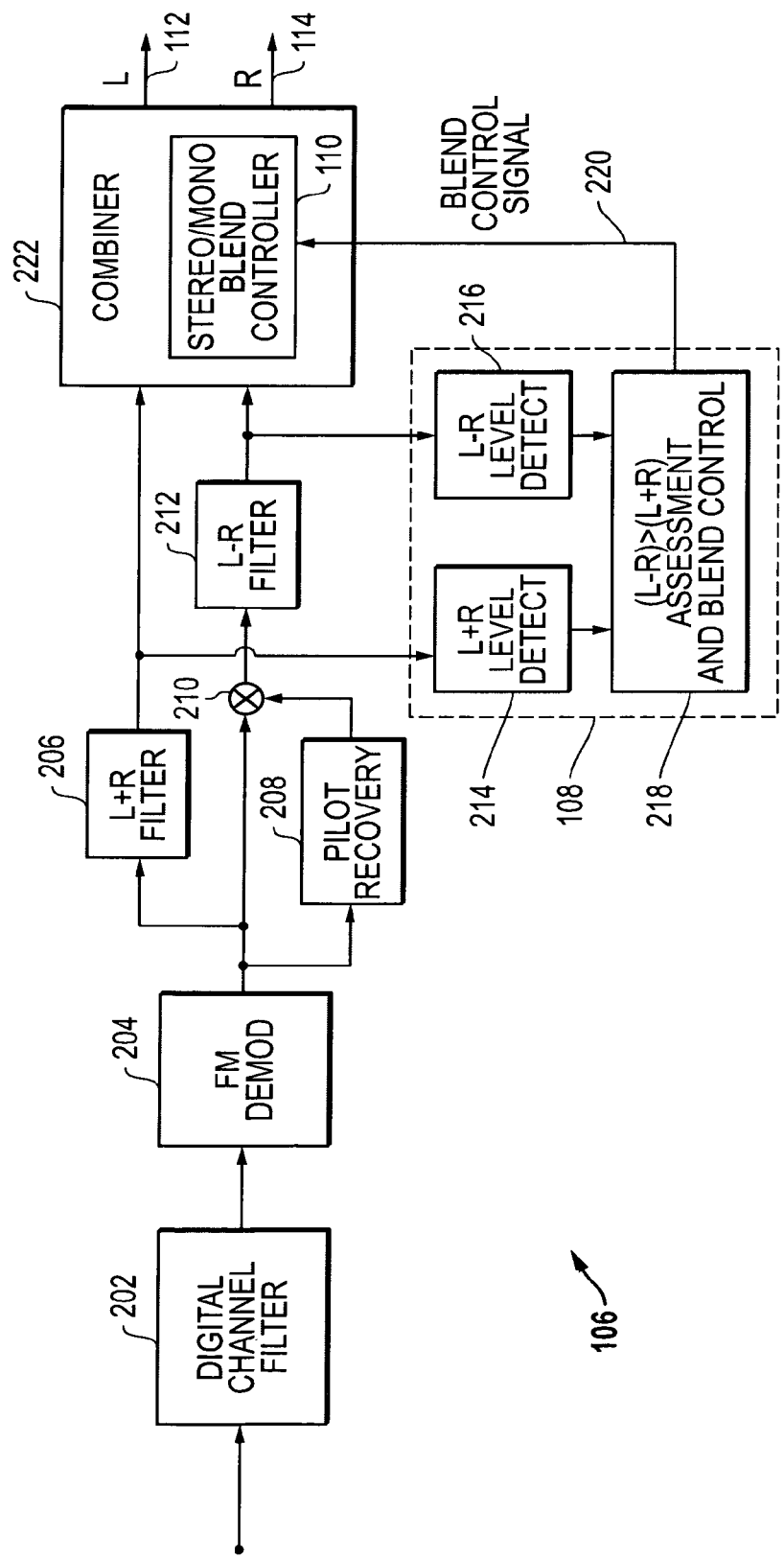
FIG. 2 is a more detailed block diagram for an embodiment including L−R and L+R level assessments as described herein.

FIG. 2 is a more detailed block diagram for an embodiment for the DSP 106 including L−R and L+R level assessments as described herein. As depicted, a digital channel filter 202 receives a digitized FM stereo MPX signal from the conversion circuitry 104. The output of the digital channel filter 202 is then passed through an FM demodulator (DEMOD) 204. The output of the FM DEMOD 204 is provided to pilot recovery circuitry 208, to digital mixer 210 and to L+R filter 206. The digital mixer 210 mixes the output of the pilot recovery circuitry 208 with the output from the FM DEMOD 204 and sends the resulting signal to the L−R filter 212. The combiner then receives the L+R signal from the L+R filter 206 and the L−R signal from the L−R filter 212. The combiner 222 then adds these two outputs to generate the left (L) channel signal 112 ((L+R)+k*(L−R)=(1+k)*L+(1−k)*R=2L when k=1), and the combiner 222 subtracts these two outputs to generate the right (R) channel signal 114 ((L+R)−k*(L−R) =(1+k)*R+(1−k)*L=2R when k=1). As stated above, varying degrees of a blend from stereo to mono can be provided by adjusting or varying k from 1 to 0 to provide the desired level of a blend from stereo to mono.

The L−R and L+R assessment block 108 also receives the L+R signal and the L−R signal. In particular, the L+R signal from the L+R filter 206 is provided to the L+R level detect block 214, and the L−R signal from the L−R filter 212 is provided to the L−R level detect block 216. The output of the L+R level detect block 214 and the L−R level detect block 216 are then provided to the L−R and L+R assessment and blend control block 218 where a determination is made whether the L−R energy is greater than the L+R energy and a determination can be made, if desired, concerning the magnitude of the difference between the L−R energy and the L+R energy. A blend control signal 220 is then output to the stereo/mono blend controller 110 based upon these determinations. The stereo/mono blend controller 110 can then use the blend control signal 220 to determine whether or not to blend to mono and/or to determine how much of a blend from stereo to mono should be made. In other words, the L−R>L+R level assessment is used as an indicator of conditions where a blend from stereo to mono should be conducted in order to reduce or mitigate stereo noise in the audio outputs.

It was noted that the DSP 106 can be implemented, if desired, by using a microcontroller and appropriate software code or firmware that can be loaded into memory storage associated with the microcontroller. In addition, the DSP 106 could be implemented with hardware or combinations of hardware and software, as desired.

Figure 3:
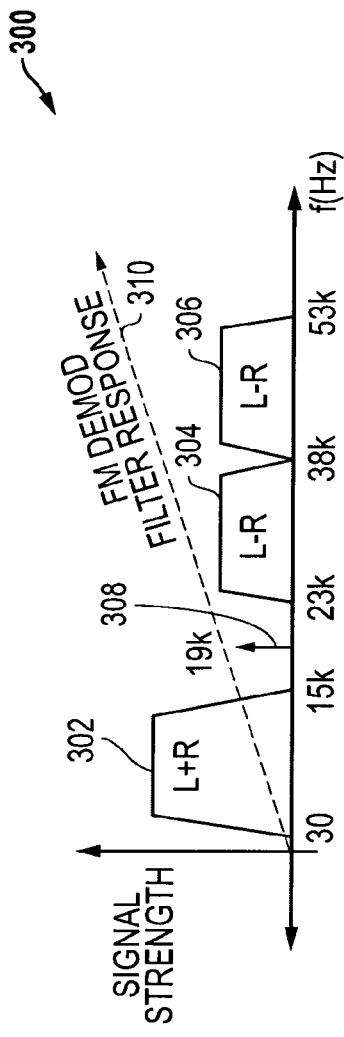
FIG. 3 is a signal diagram for stereo MPX (multiplex) signals and an effective filter response for an FM demodulator.

FIG. 3 is a signal diagram 300 for FM stereo MPX signals and an effective filter response for demodulator circuitry. As described above, the FM stereo MPX signal includes L+R information, L−R information and a 19 KHz pilot tone. The L+R information lies in band 302 between 30 Hz and 15 KHz in the tuned channel. The L−R information sits in two bands on either side of 38 KHz in the tuned channel, namely a first band 304 between 23 KHz and 38 KHz and a second band between 38 KHz and 53 KHz. And the pilot tone 308 sits at 19 KHz. The vertical axis represents signal strength and shows that the L+R energy in the MPX signal is approximately the same strength as the L−R energy when the channel is broadcast. This observation can be made because the L+R magnitude is twice the L−R magnitude, but the modulated L−R occupies twice the bandwidth of the L+R energy. The two effects cancel to give a theoretical equal energy to the two signals. In practice, the L−R energy is always less than the L+R energy, except for artificially generated test conditions. This is a consequence of the nature of audio stereo signals: most of the signal tends to be present on both L and R channels (enhancing the L+R energy relative to the L−R energy), and much less energy is needed to create the remaining "separation" signal (the L−R energy).

In normal operation, in a noise free environment, the L+R energy is expected to be greater than or equal to the L−R energy As signal conditions worsen, however, the L−R energy experiences more noise than L+R. This is a consequence of the frequency dependent gain of the FM demodulator (i.e., the FM demodulator filter response 310 shown in FIG. 3). As described herein, when an L−R>L+R condition is determined to exist, the blend controller can blend the output from stereo to mono thereby reducing the distortions and stereo noise heard in the audio output by the user.

It is further noted that when silence or low volume is broadcast on an FM channel being received with a good signal quality and signal strength, a user may still tend to hear noise on the L−R channel. For these silence or low volume conditions, the L−R>L+R assessment described herein can still act to compensate for this stereo noise by indicating a blend to mono. In this way, the silence or low volume heard by a user is made more quiet when silence or low volume is being broadcast on an FM channel. This silence or low volume condition often occurs, for example, in broadcasts having large dynamic range variations from soft to loud, such as for classical music station broadcasts.

One possible side effect of the L−R>L+R assessment, however, is an unnecessary blending to mono during silence. Recovery time from full mono to full stereo when non-silence returns will likely be fast enough, though, as to not be a nuisance to the user. Likewise, the speed of the filters within the integrated FM receiver are typically slow enough that pumping is unlikely. Further, the level assessment module can be configured so that the silence must be present for a number of seconds before an indication is made that L−R is greater than L+R and that a blend from stereo to mono should occur. A threshold number of seconds can also be configured to be programmably selected, if desired, such that the L−R>L+R condition must be found to exist for the selected number of seconds before a blend to mono will be indicated. Still further, a threshold difference amount can be set by which the L−R energy must exceed the L+R energy before a blending to mono will be initiated. This threshold difference amount can be configured to be programmably selected, if desired.

It is noted that in non-silence or higher volume conditions, the L+R signal will likely be greater than the L−R signal. As such, the L−R>L+R technique may not indicate that a blend from stereo to mono is needed unless there is silence or low volume being broadcast on the channel and/or if there is an appropriate blocker that causes additional energy in the L−R signal. However, as indicated herein, the L−R>L+R techniques could be used in conjunction with other techniques that may still indicate that a blend from stereo to mono should be conducted. The blend controller can be configured to determine how each of the included techniques are ultimately used to control the actual blend to mono for the receiver system. As such, the L−R>L+R technique described herein can be used in conjunction with one or more other techniques, such as the RSSI technique and the SNR technique described above.

Figure 4:
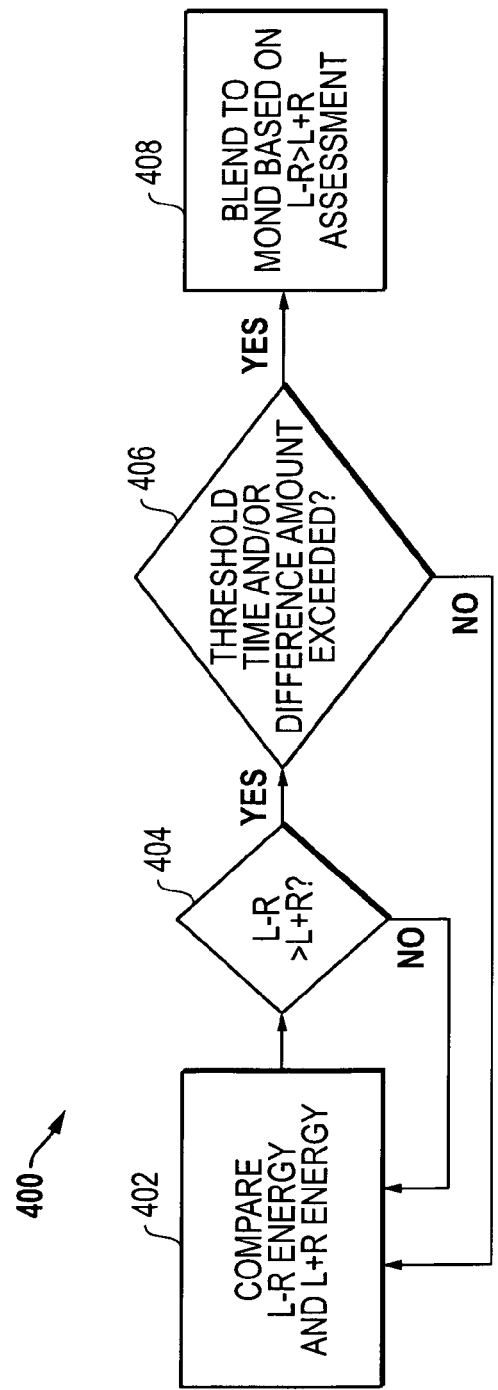
FIG. 4 is a flow diagram for blending from stereo to mono based upon an L−R>L+R assessment.

FIG. 4 is a flow diagram of an embodiment 400 for blending from stereo to mono based upon an L−R>L+R assessment. As depicted, the L−R energy is compared with the L+R energy in block 402. In block 404, a determination is made whether the L−R energy is greater than the L+R energy. If "NO," then flow proceeds back to block 402. If "YES," then flow proceeds to block 406 where a determination is made whether a threshold amount of time and/or a threshold difference amount between the L−R energy and the L+R energy have been exceeded. If "NO," then flow proceeds back to block 402. If "YES," then flow passes to block 408 where a blend from stereo to mono is conducted based upon the L−R>L+R assessment. For example, the amount of blend from stereo to mono can be made dependent upon the size of the difference between the L−R energy and the L+R energy. Other variations could be implemented, as well.

The L−R and L+R level assessments made by the embodiments described herein to determine when the L−R energy exceeds the L+R energy provide an effective technique for determining when it is desirable to perform a blend to mono. It is again noted that this technique can be used alone or in conjunction with other blend control techniques. Further, as described herein, the magnitude of the amount by which the L−R level exceeds the L+R signal can be used to control the amount of blend to mono. In other words, the blend from stereo to mono can be configured to occur in differing scalable amounts from full stereo to full mono depending upon the magnitude by which the L−R level exceeds the L+R level. Again, other techniques could also be used in conjunction with this L−R>L+R determination to control the percentage or level of the blend between full stereo and full mono.

It is further noted that one additional technique for making stereo-to-mono blend determinations is an assessment of multi-path distortions. This multi-path analysis, for example, can be used in conjunction with both the prior RSSI and SNR techniques described above and the L−R>L+R technique described herein. The multi-path distortion analysis can look for low frequency components in amplitude modulations within the received signal. Unlike the SNR analysis that will typically look more to high frequency components in the amplitude modulations, the low frequency components are more indicative of multi-path distortions.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for mitigating stereo noise in FM broadcast receivers, comprising:
   receiving an FM channel having a spectrum including L+R (left-plus-right) energy and L−R (left-minus-right) energy;
   comparing L−R energy to L+R energy; and
   blending from a stereo output signal into a mono output signal when L−R energy exceeds L+R energy.

2. The method of claim 1, wherein the comparing step comprises determining a difference between L−R energy and L+R energy.

3. The method of claim 2, wherein the blending step comprises blending completely from a stereo signal to a mono signal as the difference between L−R energy and L+R energy increases.

4. The method of claim 1, wherein the blending step comprises blending from a stereo signal to a mono signal only after L−R energy exceeds L+R energy for a number of seconds.

5. The method of claim 4, further comprising allowing the number of seconds to be programmably selected.

6. The method of claim 1, wherein the blending step comprises blending from a stereo signal to a mono signal only if L−R energy exceeds L+R energy by an threshold amount.

7. The method of claim 6, further comprising allowing the threshold amount to be programmably selected.

8. The method of claim 1, further comprising utilizing additional assessments concerning the received FM channel to determine when to perform the blending step.

9. The method of claim 8, further comprising using an indication of a receive signal strength for the received FM channel or a signal-to-noise ratio for the received FM channel as an additional assessment.

10. The method of claim 8, further comprising using an assessment of low frequencies within amplitude modulations of the received FM channel for a multi-path distortion determination as an additional assessment.

11. The method of claim 1, further comprising processing received FM channel to provide a left (L) channel output signal and a right (R) channel signal output signal.

12. An FM broadcast receiver system having stereo noise mitigation, comprising:
 analog receive circuitry configured to receive an FM channel having a spectrum including L+R (left-plus-right) energy and L−R (left-minus-right) energy;
 conversion circuitry configured to receive analog signals from the receive circuitry and to output digital signals including L+R energy and L−R energy; and
 digital signal processing (DSP) circuitry coupled to receive the digital signals from the conversion circuitry, the DSP circuitry being configured to compare L−R energy to L+R energy and to control blending of audio output signals from stereo into mono when the L−R energy exceeds the L+R energy.

13. The FM broadcast receiver system of claim 12, wherein the DSP circuitry is further configured to determine a difference between L−R energy and L+R energy.

14. The FM broadcast receiver system of claim 13, wherein the DSP circuitry is further configured to cause blending completely from a stereo signal to a mono signal as the difference between L−R energy and L+R energy increases.

15. The FM broadcast receiver system of claim 12, wherein the DSP circuitry is further configured to cause blending from a stereo signal to a mono signal only after L−R energy exceeds L+R energy for a number of seconds.

16. The FM broadcast receiver system of claim 14, wherein the number of seconds is programmably selectable.

17. The FM broadcast receiver system of claim 12, wherein the DSP circuitry is further configured to cause blending from a stereo signal to a mono signal only if L−R energy exceeds L+R energy by an threshold amount.

18. The FM broadcast receiver system of claim 17, wherein the threshold amount is programmably selectable.

19. The FM broadcast receiver system of claim 12, wherein the DSP circuitry is further configured to use additional assessments concerning the received FM channel to determine when to blend the audio output signals from stereo to mono.

20. The FM broadcast receiver system of claim 19, wherein an additional assessment comprises an indication of a receive signal strength for the received FM channel or a signal-to-noise ratio of the received FM channel.

21. The FM broadcast receiver system of claim 19, wherein an additional assessment comprises an assessment of low frequencies within amplitude modulations of the received FM channel for a multi-path distortion determination.

22. The FM broadcast receiver system of claim 12, wherein the DSP circuitry comprises a digital channel filter, an FM demodulator, a L+R filter, a L−R filter, and an L−R and L+R assessment block.

23. The FM broadcast receiver system of claim 22, wherein the combiner further comprises a combiner configured to output a left (L) channel output signal and a right (R) channel output signal as audio output signals and a blend controller configured to control the blend from stereo to mono for the audio output signals.

24. The FM broadcast receiver system of claim 12, wherein the DSP circuitry comprises a microcontroller configured to run firmware stored in memory storage associated with the microcontroller.

* * * * *